United States Patent [19]

Quinlan et al.

[11] Patent Number: 5,205,567
[45] Date of Patent: Apr. 27, 1993

[54] REINFORCED INFLATABLE PACKER

[75] Inventors: Roy G. Quinlan, Littleton; James C. Vance, Sr., Sedalia, both of Colo.

[73] Assignee: The Gates Rubber Company, Denver, Colo.

[21] Appl. No.: 784,835

[22] Filed: Oct. 30, 1991

[51] Int. Cl.$^5$ .............................................. F16J 15/32
[52] U.S. Cl. ...................... 277/34; 277/34.6; 166/187
[58] Field of Search ................. 277/34, 34.6; 166/187; 138/129

[56] References Cited

U.S. PATENT DOCUMENTS

| | | | |
|---|---|---|---|
| 2,872,230 | 2/1959 | Desbrandes | 277/34.6 |
| 3,905,399 | 9/1975 | Dunnet | 138/129 X |
| 4,614,346 | 9/1986 | Ito | 277/34 |

Primary Examiner—William A. Cuchlinski, Jr.
Assistant Examiner—Daniel G. DePumpo
Attorney, Agent, or Firm—J. L. Isaac; C. H. Castleman, Jr.; H. W. Oberg

[57] ABSTRACT

An inflatable packer is disclosed and includes an elastomeric tubular body adapted for radial expansion and having a longitudinal axis. The packer includes an elastic outer cover surrounding said tubular body, and coupling members disposed on each end of the tubular body. A plurality of substantially concentric reinforcing layers are stacked atop each other and sandwiched between the body and the cover. Each layer includes spirally wound reinforcing members extending the length of the body between the coupling members. The reinforcing members and each of layers has a uniform lay angle at any circumferential position along the length of the body, with a lay angle of the members in one of the layers differing from the lay angles of the remaining layers at the same circumferential position along the length of the body.

15 Claims, 3 Drawing Sheets

REINFORCED INFLATABLE PACKER

BACKGROUND OF THE INVENTION

1. Field of the Invention

The present invention relates generally to an inflatable packer attached to a supporting element for sealing an annular space in a well bore and, more particularly, to an improved inflatable packer having a high pressure resistance. Specifically, the present invention relates to inflatable packers having improved reinforcement structure to prevent premature failure under high pressure conditions.

2. Description of the Prior Art

Inflatable packers are down-hole tools useful in the well drilling industry as well as in other piping applications. An inflatable packer is internally inflatable utilizing a fluid for the purpose of sealing off an annular space in the well or pipe, for example, between the casing and the well bore, or between a drill string or other retrievable tool in an outer well casing. Although not so limited, the packer of the present invention is particularly suited for isolating zones within a well for such purposes as cementing, fracturing, treating, testing, preventing gas migration to the surface and for gravel pack operations.

Inflatable packers normally include an elastomeric body and a reinforcement sheath or layer. The elastomeric tubular body is adapted for inflation such that the center portion extends radially outwardly to forcibly engage the well bore or well casing thereby positioning the packer and the well. Typically, the inflatable portion of the packer includes a center portion which is uniformly inflated so as to provide a collar or sleeved area engaged with the well bore. The ends of the packer have couplings to enable the packer to be attached to a drill string, and the area between the couplings and the center portion is a transition zone that is gradually expanded from the narrow non-expanded coupling to the fully expanded center portion.

Typically, the reinforcement elements or sheaths may include a plurality of strain-resistant elements or cords of high modulus that extend helically about the tubular body in one or more layers or plies. These reinforcement elements are then clamped or in some other manner attached at their ends to the end couplings of the packers so as to terminate at the end couplings. An example of one such arrangement is illustrated in U.S. Pat. No. 4,614,346. The angle that the reinforcement elements make relative to the longitudinal axis of the tubular elastomeric body is known as the lay angle inasmuch as this is the angle at which the helically wound elements are laid up around the uninflated tubular body. When the packer is inflated, the angle that the cords make relative to the longitudinal axis is known as the angle of equilibrium between the hoop tension and the axial tension of the cord, since it is at an angle to the longitudinal axis. A specific, specialized equilibrium angle is known in the hose art as the lock angle, i.e., 54° 40', at which point the cords provide maximum reinforcement strength relative to radial expansion of the rubber hose.

Recognized problems with prior packers have been the inability to securely anchor reinforcing elements of the packer body to end sleeve or coupling members during inflation due to the axial force created on the reinforcement members as the tube expands radially outwardly and the reinforcing members are stretched away from the coupling connections. In addition, there is a tendency for the reinforcing elements to separate from each other and permit elastomeric material to be pressured up between them, thereby providing weak spots in the reinforcement subject to pinhole leaks and eventual blow-outs at the expansion area of the packer. Again, U.S. Pat. No. 4,614,346 attempts to alleviate this problem by providing multiple layers of helical wound reinforcing elements, with each layer having alternate lay angle winds with respect to the packer axis. Examples of other prior art devices which attempt to alleviate the aforementioned problems include those disclosed in U.S. Pat. No. 2,643,722, No. 2,872,230, No. 2,970,651, No. 3,028,915, No. 3,035,639, No. 4,191,383, No. 4,700,954, and Canadian Patent No. 702,327.

Another attempt at enhancing the performance of such inflatable packers and reduce the premature failure rate is included in a related application filed by the inventors of this application simultaneously herewith, that is application Ser. No. 07/784,336 filed on Oct. 29, 1991. In this particular application, enhanced resistance to pressure and enhanced mounting ability of the reinforcement elements at the coupling members was achieved by varying the lay angle from the coupling members toward the center, expansion portion of the packer. Despite this and other numerous attempts, however, to alleviate or at least reduce the aforementioned problems, there is still a need for additional inflatable packer construction designs which further reduce the problems of reinforcement element rupture at their juncture with the end couplings, of the tendency of the elastomeric body of the packer to rupture or develop pinhole leaks, and of the failure of the packer body to return substantially to its original uninflated configuration after repeated inflation/deflation cycles.

SUMMARY OF THE INVENTION

Accordingly, it is one object of the present invention to provide an inflatable packer with improved rupture resistance.

It is another object of the present invention to provide an improved inflatable packer capable of withstanding high internal inflation pressures and external differential pressures across the packer element.

Still another object of the present invention is to provide an inflatable packer which reduces differential hoop and axial stress on the reinforcing elements during inflation and deflation.

Yet another object of the present invention is to provide an inflatable packer which more uniformly distributes load across the reinforcing element structure during inflation and deflation.

To achieve the foregoing and other objects and in accordance with a purpose of the present invention as embodied and broadly described herein, an inflatable packer is disclosed and includes an elastomeric tubular body adapted for radial expansion and having a longitudinal axis. An elastic outer cover surrounds the tubular body, and coupling members are disposed on each end of the tubular body. A plurality of substantially concentric reinforcing layers are stacked atop each other and are sandwiched between the body and the cover. Each layer includes spirally wound reinforcing members extending the length of the body between the coupling members. The reinforcing members in each layer have a uniform lay angle at any circumferential position along the length of the body, with the lay angle of the reinforcement members in one layer differing from the lay angles of the reinforcing members of the remaining layers at the same circumferential position along the length of the body.

BRIEF DESCRIPTION OF THE DRAWINGS

The accompanying drawings, which are incorporated in and form part of the specification, illustrate preferred embodiments of the present invention and, together with a description, serve to explain the principles of the invention. In the drawings.

DETAILED DESCRIPTION OF THE PREFERRED EMBODIMENTS

Figure 1:
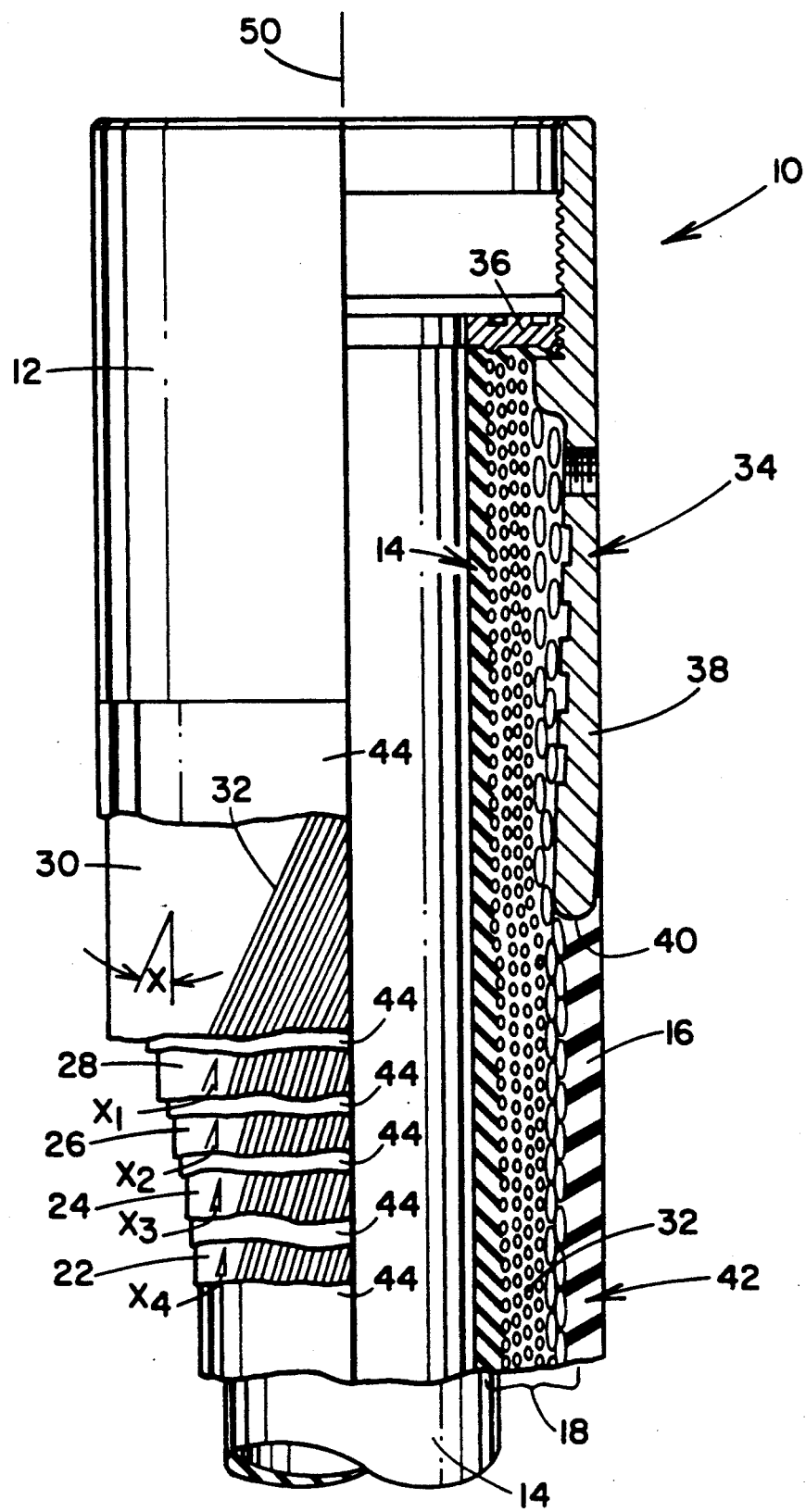
FIG. 1 is a vertical sectional view, partially broken away, of an inflatable packer and tool assembly illustrating the variable angled plies of the present invention wherein the reinforcement elements are of uniform lay angles throughout the length of each ply.

Referring first to FIG. 1, a typical inflatable packer device 10 is generally known to the art. The packer assembly 10 includes a packer element 12 which is made up of an elastomeric tubular body 14, an outer elastic cover 16 preferably made of an abrasion resistant elastomeric material, and a plurality of annular reinforcement sheaths or layers 18. In the illustrative example, the sheath area 18 includes an innermost sheath or ply 22, a third sheath or ply 24, a fifth sheath or ply 26, a seventh sheath or ply 28, and a nineth sheath or ply 30. In the illustrated embodiment, there are ten sheaths or plies, but only five are shown. The remaining five sheaths are mere mirror single plies of reverse angle wound cords and alternate with the illustrated plies 22-30, such reverse angle winding being well known in the art as clearly seen in U.S. Pat. No. 4,614,346 to Ito, the contents of which are specifically incorporated herein by reference. The most preferred embodiment includes a packer element 12 having 10 sheath or plies in the sheath area 18, although packers having 3, 4, 6, and 8 plies are also envisioned. Each sheath 22-30 is separated from adjacent sheaths by a layer of adhesive material 44. The plies with opposite hand cords are also separated by such adhesive material as clearly seen in the Ito reference. Each sheath 22-30 includes a plurality of individual reinforcement elements 32 which are spirally wound about the tubular body 14, each of the elements 32 preferably being in the form of reinforcement cords or cables. Each of the cords 32 and each sheath 22-30 of cords 32 are preferably laid up individually to provide uniform tension therealong. Each cord 32 may be made of any appropriate material such as braid, metal wire, fiber or the like.

Figure 2:
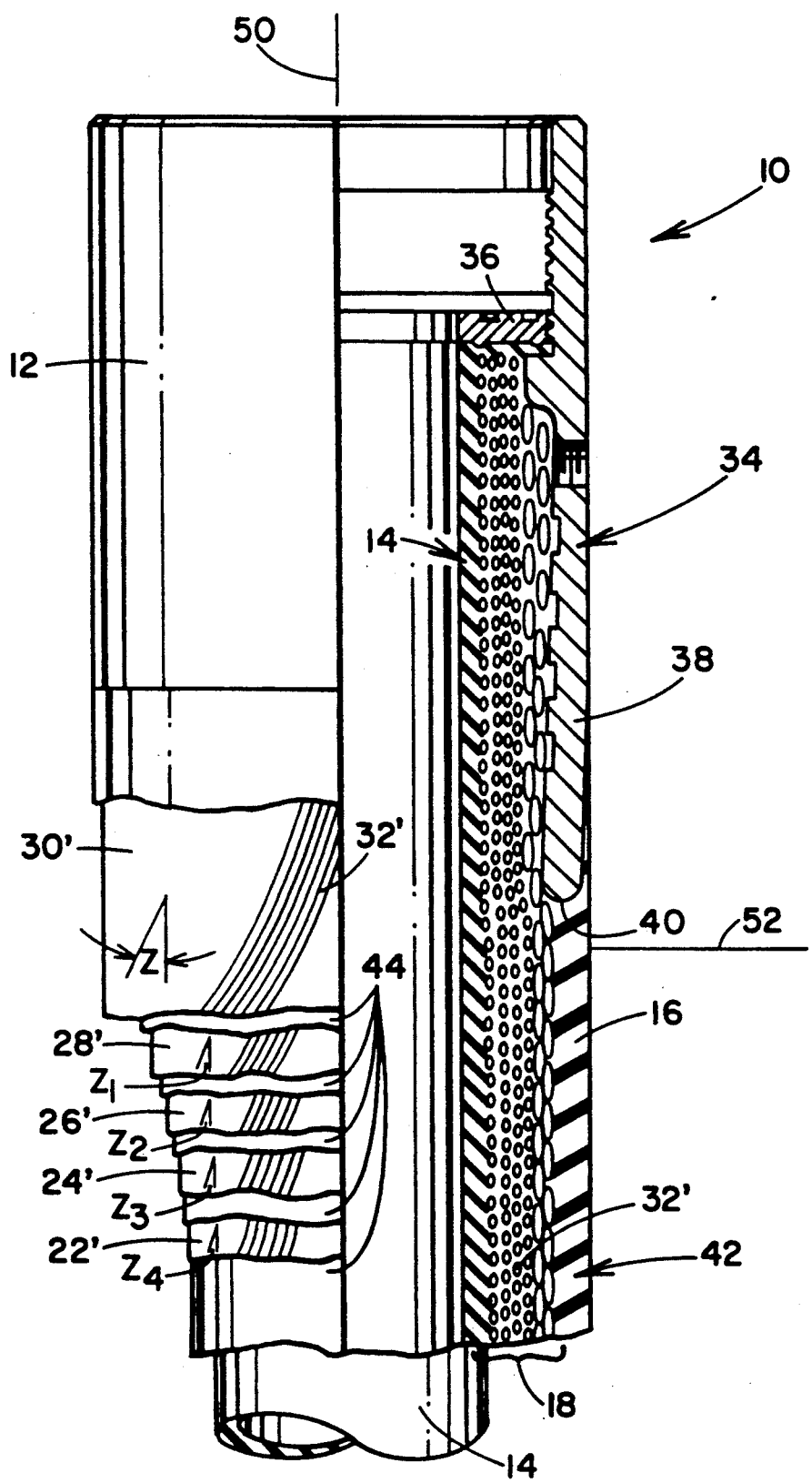
FIG. 2 is a vertical sectional view, partially broken away, of an inflatable packer and tool assembly similar to that of FIG. 1 only illustrating the embodiment wherein the lay angle of the reinforcement elements of each ply varies from the coupling to the center portion of the packer element.

In the embodiment illustrated in both FIGS. 1 and 2, the packer 12 is terminated at its end by a ferrule or end member 34 which includes an end piece 36 and an annular ring or sleeve 38 which is readily engageable with the end piece 36. Other end cap or coupling arrangements, however, may be utilized with the present invention. The annular ring or sleeve 38 is preferably affixed to the outer cover 16 at the interface 40 by the use of any standard typical attachment means such as epoxy resin and the like. Thus, the annular sleeve 38 of the ferrule 34 represents a rigid and unexpandable portion of the packer 12, this arrangement being repeated on both ends of the packer 12.

As can be seen from FIG. 1, the reinforcement elements 32 have a uniform lay angle throughout the length of each ply 22-30. For example, referring to ply 30, the elements 32 therein have a lay angle X which is uniform throughout the entire length of the ply 30. As the plies get closer to the inner tube 14, the lay angle decreases in size. Thus, the lay angle $X_1$ of ply 28 is less than the lay angle X of ply 30. Likewise, the lay angle $X_2$ is less than the angle $X_1$, the lay angle $X_3$ is less than the angle $X_2$, and the lay angle $X_4$ is less than the lay angle $X_3$. Thus, the lay angle $X_4$ of the ply 22, which is the inner most ply adjacent to the tube 14, has the lowest lay angle. In this manner, when the inflatable portion 42 of the device 10 is in fact inflated from within, the cords 32 of the innermost ply 22 are subjected to the greatest amount of radial outward movement relative to the outer most ply 30. As the elements 32 are moved radially outwardly, the lay angle increases, (e.g., from 17° lay angle to 54° locked angle). Thus, the lay angles $X-X_4$ are sized such that upon full inflation of the packer device 10, the angle $X_4$ will be at the minimum slightly less than the angle X and preferably equal to the angle X so that all of the angles $X-X_4$ are substantially the same, which is the equilibrium angle. In one form of the invention, this same angle is the locked angle. By providing the same equilibrium angle for all the elements 32 and each of the plies 22-30, the hoop stress and tension load on the packer element 12 is more evenly distributed throughout all of the plies 22-30 of the device 10.

Figure 4:
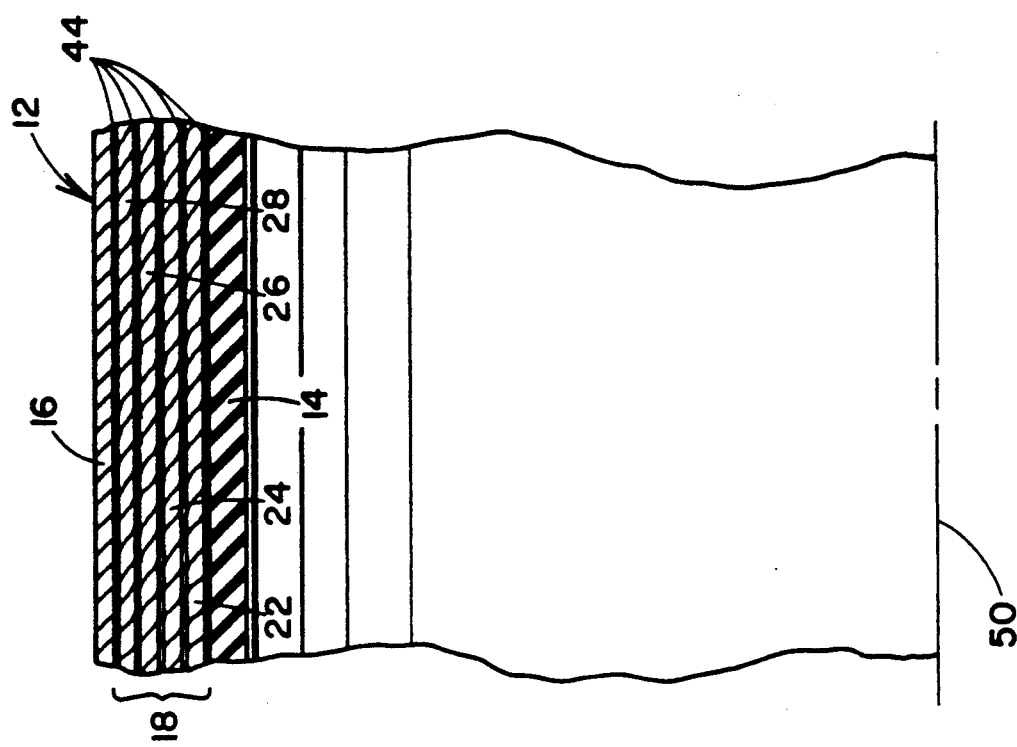
FIG. 4 is a view substantially similar to that of FIG. 3 but illustrating the tube, plies and cover arrangement when extended to a locked or equilibrium angle.
Figure 3:
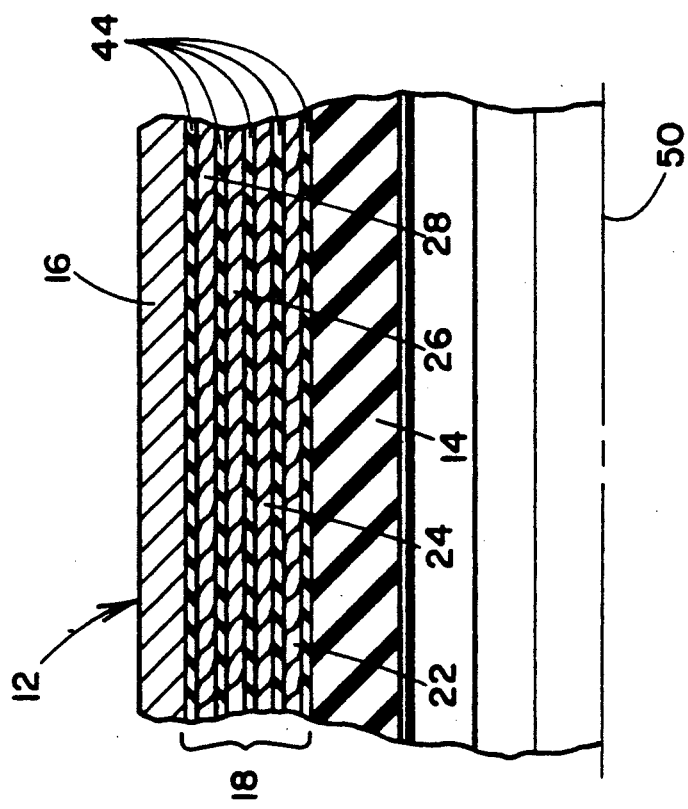
FIG. 3 is an enlarged, partial cross-sectional schematic illustrating the cord and rubber profile of the inflatable packer of the present invention in an uninflated state.

Referring to FIGS. 3 and 4, this feature is particularly illustrated. In FIG. 3, the inner tube 14 is separated from the outer cover 16 by a plurality of layers of reinforcement plies 18. Each of the plies 18 is separated by a gum layer or an adhesive layer 44. In this instance, only 4 plies at 22-28 are illustrated. Upon expansion of the element 12 as illustrated in FIG. 4, all of the adhesive layers 44 are substantially compressed along with the inner tube 14 and the outer cover 16. This compression increases the angle $X_4-X_1$ of the plies 22-28, with the angle $X_4$ of the inner ply 22 being increased the most since it travels radially outwardly the furthest from the center line 50. In this manner, the difference in the angles between $X_4$ to X is adjusted so that the amount of angle change of each of the lay angles $X_4-X$ resulting from the radially outwardly travel of the plies 22-30 substantially reduces the angular difference between $X_4-X$ and, most preferably, brings the angles $X_4-X$ substantially the same in an equilibrium angle. In this manner, the load throughout each of the plies 22-30 is evenly distributed throughout the length and thickness of the device 10 upon inflation of the device 10.

Referring to FIG. 2, a slight variation of the present invention is illustrated therein wherein the elements 32' have a variable angle from the coupling 34 toward the center portion of the device 10. Reference is made to our co-pending patent application Ser. No. 07/784,336 illustrating an inflatable packer in its inflated position and further inflating the variable angle wind claimed therein and disclosed herein. Nonetheless, at any given circumferential or cross-sectional line 52, the elements 32' in the ply 30' are the same along line 52. Likewise, the elements 32' or the layer 28' and so forth to the layer 22' are similarly the same along line 52. However, the lay angle Z is substantially greater than the lay angle $Z_4$ along the line 52 in a manner similar to that illustrated in FIG. 1. Therefore, the lay angle $Z_4$ is less than the lay angle $Z_3$ which is less than the lay angle $Z_2$ which is less than the lay angle $Z_1$ which is less than the lay angle Z in a manner similar to that of FIG. 1. Likewise, when the packer device 10 is inflated, the lay angle $Z_4$ is increased substantially greater than the lay angle Z and therefore reduces the difference between the lay angle $Z_4$ and the lay angle Z as well as the lay angles of the plies 24–28 therebetween. In a most preferred form, the lay angles $Z_4$ of the ply 22' becomes substantially equivalent to the lay angle Z of the ply 30' upon packer expansion throughout the entire length of the packer element 12 so as to create an equilibrium layer throughout the entire length of the packer element 12 in each of the plies 22'–30'. Again, in this manner, the hoop and axial stress loads are evenly distributed throughout the length as well as the thickness of the packer element 12.

When the above equalization of the lay angles and equal distribution of the loads occurs, the radial stress at the inflated portion of the packer is considerably reduced, and the axial stress at the coupling junction 40 is also considerably reduced between the individual elements 32 and 32' and the coupling member 34. Therefore, the device 10 can withstand substantially greater internal pressures by the more even distribution of the load created by those pressures which even distribution is resulting from the present invention.

In one example of a packer element constructed in accordance with the present invention, the diameter which a packer can be expanded was determined to be defined by the following formula:

$$\frac{\text{Cord C.L. dia. at build}}{\text{Sine of applied cord angle}} = \frac{\text{Cord C.L. dia. when expanded}}{\text{Sine of locked angle}}$$

For example, if the layer of cord is applied at a 2.500 in. cord centerline diameter, at 17°, and the locked angle is 54°, that layer of cord reaches locked angle at 6.91 in. cord centerline diameter. If the second layer of cord is then wound at a 2.600 in. cord centerline diameter (this spacing being caused by both the cord thickness and the adhesion gum layer 44 thickness between the layers of the cord) this layer must be laid at 17.44° to cause it to reach the 54° locking angle at 7.018 in. (0.100 in. greater diameter than the first ply).

When the above packer included 10 plies of reinforcement, the outermost ply is wound at a cord centerline diameter of 3.400 inches. To equally share the load, it must achieve the locked angle of 54° at an expanded cord centerline diameter of 7.918 inches. Thus, the cord is wound at an angle of 20.33 degrees to cause this to happen.

As previously indicated, the locking angle may not be 54°+but rather some other equilibrium angle. However, all layers must achieve substantially the same angle when pressurized if they are to share the forces equally. Therefore, the relationships defined above are valid for any locked angle or equilibrium angle. This is significant in the fabrication of inflatable packers.

The use of correct lay angles on each ply of reinforcement sheath results in an improved and more consistent performance in the packer 10. In products with numerous layers of reinforcement, the correct reinforcement angles even permit reduction of the number of plies required as compared to prior art designs. This is a significance in savings in material and labor. Moreover, performance of the packer is greatly enhanced by reducing the problem of separation of cords in the center expansion zone. The present invention also reduces the level of axial stress on the cords at their junction with their end couplings, thereby reducing the rupture tendency near the couplings by substantially inhibiting separation forces between the cords and the couplings by even distribution of the loads throughout the packer. Finally, the present invention further enables the packer to return to its original uninflated state after numerous cycles of inflation and deflation due to the even load of stress. The result of the above is that the present invention provides a packer which is substantially improved relative to its capability of withstanding high pressures and reducing rupture potential, and is perhaps requiring fewer plies of reinforcing elements due to more even load distribution.

The foregoing description of the illustrative embodiments of the present invention have been shown in the drawings and described in detail in varying modifications and alternate embodiments. It should be understood, however, that the foregoing description of the invention is exemplary only, and the scope of the invention is to be limited only to the claims as interpreted in view of the prior art. Moreover, the invention illustratively disclosed herein suitably may be practiced in the absence of any element which is not specifically disclosed herein.

We claim:

1. An inflatable packer comprising:
   an elastomeric tubular body adapted for radial expansion and having a longitudinal axis;
   an elastic outer cover surrounding said tubular body;
   coupling members disposed on each end of said tubular body; and
   a plurality of substantially concentric reinforcing layers stacked atop each other and sandwiched between said body and said cover, each said layer including spirally wound reinforcing members extending the length of said body between said coupling members, with alternating layers having alternating right and left hand wound members, respectively, the reinforcing members in each said layer having a uniform lay angle at any cross-sectional circumferential position along the length of said body, with the lay angle of the members in one said layer differing from the lay angle of the same hand members of the remaining layers at the same cross-sectional circumferential position along the length of said body, the difference between the lay angles of the same hand members of said layers being an effective amount that upon inflation of said packer, the same hand members of all said layers achieve a substantially common equilibrium angle at the same cross-sectional circumferential position along the length of said body.

2. The packer as claimed in claim 1, wherein the lay angle of said members in each layer are the same throughout the length of that particular layer.

3. The packer as claimed in claim 1, wherein the lay angle of the reinforcing members in each said layer varies from the coupling toward the center portion of said layer in a uniform manner throughout each separate layer.

4. The packer as claimed in claim 1, wherein the lay angle of the reinforcing members in each layer increase in each concentric layer away from said tube toward said cover before inflation.

5. The packer as claimed in claim 4, wherein said equilibrium angle is a locked angle achieved simultaneously by the reinforcement members in each layer upon inflation of said packer.

6. The packer as claimed in claim 1, wherein each reinforcing layer is separated by adhesive material.

7. The packer as claimed in claim 1, wherein the difference in lay angle between the members of each layer is such as to distribute load evenly among the layers upon inflation of said packer.

8. The packer as claimed in claim 1, wherein said packer includes 10 reinforcing layers.

9. In an inflatable packer having an elastomeric tubular body adapted for radial expansion and including a longitudinal axis, a plurality of reinforcement sheaths layered over said body, each said sheath including a ply of spirally wound reinforcement elements with the elements being of alternating right and left hand wound elements in alternating sheaths, respectively, an elastic outer cover surrounding said reinforcement sheaths and tube, and coupling members disposed on each end of said tubular body, said tubular body and cover having a center portion adapted for substantial uniform radial expansion, the improvement wherein the lay angles of the elements in each said sheath are substantially uniform along any circumferential position about said tube, and wherein the lay angle of said elements in each said sheath differ from the angle of the same hand elements in the other sheaths at the same circumferential position, the difference in angles between sheaths being an effective amount that upon expansion and inflation of said packer, the same hand elements of all said sheaths achieve substantially the same angle along the same circumferential position on said body.

10. The improvement of claim 9, wherein the lay angle of the elements in each said sheath are the same throughout said sheath.

11. The improvement of claim 9, wherein the lay angle of each said sheath varies along the length of said sheath from said coupling toward said center portion.

12. The improvement of claim 9, wherein the lay angle of each said sheath decreases relative to the sheaths disposed radially outwardly therefrom before inflation.

13. The improvement of claim 12, wherein the elements of each sheath achieve a locking angle upon inflation of said packer, said locking angle being achieved substantially simultaneously.

14. The improvement of claim 9, wherein each said sheath of elements is separated by adhesive material.

15. An inflatable packer comprising:
an elastomeric tubular body adapted for radial expansion and having a longitudinal axis;
an elastic outer cover surrounding said tubular body;
coupling members disposed on each end of said tubular body; and
a plurality of radially layered plies of reinforcement elements positioned between said body and said cover, the reinforcement elements of each said ply being spirally wound about the length of said body between said coupling members, with alternating plies having alternating right and left hand wound elements, respectively, the lay angle of the elements in each said ply being different from the remaining plies of the same hand elements in said packer such that the lay angles of the same hand elements of each ply is substantially the same as the same cross-sectional position upon inflation of said packer so as to evenly distribute loads throughout the various plies upon said inflation.

* * * * *